United States Patent [19]

Fletcher

[11] 4,284,275
[45] Aug. 18, 1981

[54] POLYURETHANE GRIPPING MATERIAL

[76] Inventor: Herbert E. Fletcher, 34807 Calle Del Sol, Capistrano Beach, Calif. 92624

[21] Appl. No.: 83,572

[22] Filed: Oct. 11, 1979

[51] Int. Cl.³ .......................................... B29D 27/04
[52] U.S. Cl. ................................... 273/75; 264/49; 264/293; 273/72 R; 273/DIG. 8; 428/37; 428/141
[58] Field of Search ............... 264/49, 293; 273/81 R, 273/81 D, 81 B, 81.5, 75, 72 R, DIG. 8; 428/38, 141

[56] References Cited

U.S. PATENT DOCUMENTS

| | | | |
|---|---|---|---|
| 1,581,647 | 4/1926 | Layton | 273/75 X |
| 1,990,937 | 2/1935 | Forbes | 273/81 R X |
| 2,309,933 | 2/1943 | Churchill | 273/75 X |
| 2,466,502 | 4/1949 | Stiller | 273/81 D X |
| 2,569,546 | 10/1951 | Treue | 264/49 X |
| 2,583,198 | 1/1952 | Axton | 273/75 |
| 2,793,136 | 5/1957 | Root | 273/75 X |
| 2,983,512 | 5/1961 | Fleischer | 273/75 X |
| 2,983,960 | 5/1961 | Jilge | 264/49 X |
| 2,997,746 | 8/1961 | O'Brien et al. | 264/49 X |
| 3,028,283 | 4/1962 | Lundgren et al. | 273/81 R X |
| 3,489,031 | 1/1970 | Meier | 273/81 R X |
| 3,549,398 | 12/1970 | Watson | 264/49 X |
| 3,606,326 | 9/1971 | Sparks et al. | 273/81 R |
| 3,700,380 | 10/1972 | Kitrilakis | 264/49 X |
| 3,770,033 | 11/1973 | Gavillet et al. | |
| 3,809,600 | 5/1974 | Larson | 428/141 X |
| 3,813,729 | 6/1974 | Szabo et al. | 273/81 R X |
| 3,848,871 | 11/1974 | Sweet et al. | 273/81 B X |
| 3,972,528 | 8/1976 | McCracken et al. | 273/81 R X |
| 4,053,676 | 10/1977 | Kaminstein | 273/81.5 X |
| 4,098,506 | 7/1978 | Gaiser | 273/75 |

FOREIGN PATENT DOCUMENTS

| | | | |
|---|---|---|---|
| 2805315 | 8/1979 | Fed. Rep. of Germany | 273/75 |
| 330243 | 6/1930 | United Kingdom | 273/75 |

*Primary Examiner*—Philip Anderson
*Attorney, Agent, or Firm*—Richard H. Zaitlen

[57] ABSTRACT

A polyurethane gripping material for hand held implements. The material is an adhesive backed polyurethane sheet which includes a plurality of small pores on the surface of the sheet. The pores are formed by sprinkling salt on the surface of the sheet while it is in a softened state. The sheet is then cured and sanded down to expose and remove some of the salt granules. Many small pores are exposed by the removal of the salt. The pores act as suction cups to increase the performance of the grip.

7 Claims, 3 Drawing Figures

POLYURETHANE GRIPPING MATERIAL

BACKGROUND OF THE INVENTION

1. Field of the Invention

This invention relates to a material which enhances the grip on handles of hand-wielded implements such as tennis rackets or baseball bats to increase the coefficient of surface friction between the hand of the user and the handle. This invention also relates to a fabrication method for a grip-enhancing material which produces small surface pores that act as miniature suction cups to grip the hand of the user.

2. Description of Prior Art

In most physical endeavors where a hand-held tool or implement is employed, it is desirable to maintain a sure grip on the handle of the implement. Where the user's hand perspires and the implement is being continuously used, the user is much more prone to lose his grip. This is especially true for implements such as sports rackets which are subjected to intermittent impact forces.

In an attempt to provide a better grip, a group of prior art grip enhancing means has been devoted to the development of molded foam grips manufactured out of plastic or rubber and which contain a large number of small air cells within the material. Sparks (U.S. Pat. No. 3,606,326) discloses a foamed sponge elastomer of the type to be used as a grip for golf clubs and the like. Similarly, Szabo (U.S. Pat. No. 3,813,729) discloses an injection molded foam hand grip for use on a U-shaped suitcase or attache handle. Gavillet (U.S. Pat. No. 3,770,033) discloses a foamed plastic handle for impact tool such as a hammer. The closed cells of this type of grip are created when the grip is formed. Usually this is achieved by forming the grip from a material which is initially soft and moldable. The material is molded into the desired shape and then is solidified, usually by the addition of a catalyst. By addition of the proper chemicals the formation of gas bubbles can be initiated within the material as it solidifies. When the material finally sets, the gas bubbles are incorporated in the material as small closed cells and a "foam" is thereby formed. These prior art grips are shaped using conventional molding techniques and depend upon the compression of the foam by the user's hand to augment the natural surface friction of the grip.

These grips have the disadvantage that they must be specifically molded for the particular implement on which they are to be used. Because the molding equipment is expensive and not readily accessible to the consumer, these types of grips can only be applied to an implement's handle by the original manufacturer of the article. In addition, these types of grips are fairly bulky and are not well suited for application to a handle manufactured for use without a grip enhancing material, without increasing the diameter of the handle unacceptably. Finally this type of grip depends solely upon the surface of the foamed material to create the friction with the user's hand. Occasionally, this may be insufficient to maintain a firm sure grip.

A second type of grip is the foam material which is only used as a grip augmenting cover instead of making up an appreciable bulk of the handle as well. An example of such a grip is disclosed in Meier (U.S. Pat. No. 3,489,031) which is directed to a non-slip foam rubber cover for automobile steering wheels and the like. Another example is disclosed in Kaminstein (U.S. Pat. No. 4,053,676), in which a wax coating is used on a mutli-layered adhesive-backed foam grip cover to reduce slippage.

These cover-like grip enhancing means are also fabricated out of the closed cell foam mentioned above, but because they are thin and flexible they are more readily applied to a handle by the consumer as well as the manufacturer. In addition, application of this type of cover does not significantly alter the diameter of the handle so it may be applied to handles of implements such as tennis rackets where the diameter of the handle is chosen to suit the particular user's hand. A problem with this type of grip enhancing material, is that they too. must depend upon the natural surface friction of the material or upon external coatings for the friction enhancing characteristics of the grip.

Another type of grip designs employ molded rubber suction cups affixed to a flexible sheet which may act as a cover. This type of grip is disclosed in Sweet (U.S. Pat. No. 3,848,871) for a tennis racket handle cover and in Stiller (U.S. Pat. No. 2,466,502) as a sheet with suction cups on both sides to enhance the grip on a bar of soap around which it is wrapped. The problem with this type of grip enhancing device is that it may loosen and fail if the surface to which it is affixed has irregularities or discontinuities. The suction cups of both the above designs may become damaged or deteriorate in time, thereby impairing the suction effect. In addition, size of the suction cups described in both the above designs is such that only a limited number may be in contact with the user's hand at any one time. Therefore, if the suction of one of the cups is lost, the efficacy of the grip is seriously reduced.

A type of open pore friction grip is disclosed in McCracken (U.S. Pat. No. 3,972,528). The grip is permanently applied to a handle by dipping it into a rubber based material which subsequently solidifies to form a thin tacky film. The film bonds directly to the handle and reacts with the user's perspiration to become stickier, thereby enhancing the grip. This grip, however, cannot be readily applied to the handle by a consumer, since it is manufactured from a mixture of materials specifically formulated to bond to the handle of a metal baseball bat. Therefore, this type of grip is not well suited for application to irregular surfaces or non-metallic surfaces.

It is a primary object of the present invention to mitigate the problems of the foregoing grips by providing a thin, flexible, nonabrasive grip cover which may easily be applied by a consumer to the handles of hand wielded implements to improve the characteristics of the grip.

It is another object of the present invention to provide a material which does not use external coatings to enhance its natural surface friction, yet which has enhanced grip characteristics through the utilization of a multiplicity of pores which act as miniature suction cups.

It is yet another object of the present invention to provide a grip, the efficacy of which is enhanced in the presence of water.

SUMMARY OF THE INVENTION

The gripping material of the present invention meets these objectives. One side of a polyurethane sheet is covered with a waterproof adhesive protected by a paper backing. When the paper backing is peeled away, the sheet may be easily applied to the handle of a hand implement using only manual pressure. The natural surface friction of the polyurethane sheet is augmented by the presence of many tiny pores in the surface of the sheet which roughen its texture and also act as miniature suction cups to grip the hand of the user. The large number of pores per unit area of the material insures that the user's hand will contact a substantial percentage of these pores. The gripping characteristics of the sheet are further enhanced in the presence of water since the moisture improves the seal between the miniature suction cups and the soft tissues of the user's hand.

In the preferred embodiment, the material is fabricated in a four step process whereby liquid polyurethane resin is mixed with appropriate portions of catalyst and pigments or dyes, and then poured onto a polyethylene slab to form a sheet. Second, the sheet is sprinkled with table salt, and as the resin reacts with the catalyst, the sheet cures. Third, the cured sheet is sandpapered to achieve the desired thickness. Sanding the sheet also exposes the regions containing the salt, which falls out in the process, leaving a roughened surface and the small pores. Finally, the adhesive backing is applied to the sheet. When an implement, such as a bat or tennis racket is covered with the polyurethane gripping material and used for an extended period of time, the pores may fill with dirt or dust and the surface may become slick. However, the material may be rejuvenated by cleaning its surface with a mild cleanser or by lightly sanding its surface with a fine grade sandpaper. This causes more of the salt containing regions to be exposed to the surface thereby providing more open pores to replace those which are filled.

DETAILED DESCRIPTION OF THE DRAWINGS

Figure 1:
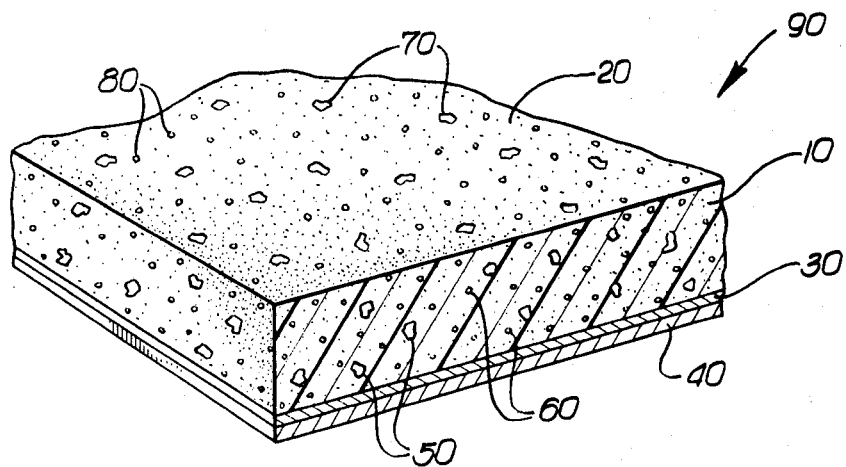
FIG. 1 is a perspective cross-sectional view of the polyurethane gripping material of the present invention.

FIG. 1 shows a cross section of a polyurethane gripping material, which comprises a plastic sheet 10, an adhesive 30, and a paper backing 40.

Preferably, the material is fabricated in a four step process. First, a quantity of polyurethane resin is mixed with sufficient catalyst to cause the resin to harden (i.e., cure). Sufficient pigmentation or dye to produce the desired tint in the final product is also added. Such urethane resins and associated catalysts, pigments and dyes are well known in the art and will not be discussed in great detail herein. Generally, the urethane resin is made by reacting a diisocyanate or polyisocyanate with glycol or other polyol. The catalyst is usually an amine, e.g., a tertiary amine, but may also be a metallic salt. In the preferred embodiment, an isocyanate-terminated prepolymer is mixed with a polyol and a catalyst and used to form the polyurethane sheet material. The quantities of dye, catalyst and resin are determined by how much of the product is to be produced in one batch.

In the second step, the mixture is poured onto a polyethylene slab in order to form a sheet. The slab is prepared by taping its perimeter with masking tape or an equivalent. This facilitates the subsequent removal of the sheet. It has also been found that buffing the slab with a buffing pad removes any foreign matter and improves the quality of the finished sheet, as well as making the sheet easier to remove. A buffing compound may be used with the buffing pad to aid in the removal of foreign matter from the slab, although it is not necessary.

After the mixture is poured onto the slab, it is evenly spread over the surface of the slab, including the masking tape. A mohair paint roller of medium nap is employed to further spread the material and to insure that the finished product is of a uniform thickness. The mixture is then salted with ordinary table salt. The salt embeds in the polyurethane material and remains there while the polyurethane resin reacts with the catalyst and causes the mixture to harden and cure. This chemical reaction foams, i.e., it produces gas bubbles within the mixture and leads to the formation of regions 60 containing gas within the sheet 10. The thickness of the sheet 10 is slightly increased by this foaming process and it also makes the final product spongy and slightly elastic. The mixture is allowed to remain on the polyethylene slab for approximately eight hours in order to harden sufficiently to proceed to the next step. The hardened polyurethane mixture forms a sheet, within which are salt regions 50 formed by the small granules of salt below the surface. It also contains gas regions 60 formed by the gas produced in the curing process.

In the third step, the material is sanded while still on the polyethylene slab, with 40 or 80 grit sandpaper to remove a portion of the upper surface of the sheet. This has the effect of opening to the surface 20 some of the regions 50 and 60 formed by the gas and salt. During the sanding, some of the salt is dislodged and brushed away, thereby creating the tiny pores 70. The salt which is not dislodged dissolves when the sheet 10 is exposed to moisture. Sanding also opens the pores 80 formed by the regions 60 containing gas, giving the final product its roughened surface texture. The sanding reduces the thickness of the sheet 10 to a thickness of about 5 to 50 mils. The masking tape is then lifted from the periphery of the polyethylene slab and the sheet 10 carefully peeled from the slab. This completes the fabrication of the sheet 10.

If desired, adhesive 30 is applied to the back of the sheet 10. To do this, the sheet 10 is laid sanded side down on a flat surface. The adhesive 30 is supplied together with its own paper backing 40, so enough must be used to cover the entire area of the sheet 10. The surface of the sheet 10 is carefully brushed before the adhesive 30 is applied, in order to remove any foreign particles. In addition, the temperature is held at or above approximately 70 degrees F. in order to maintain the iness of the adhesive 30 in a tacky condition. One edge of the paper-backed adhesive sheet 30 and 40 is then attached by hand to the corresponding edge of the sheet 10. This is done so as to prevent the formation of any air bubbles between the adhesive 30 and the polyurethane sheet 10. After enough of the adhesive 30 is applied by hand so that the remainder attaches evenly, a roller or tube is used to attach the remainder by rolling it progressively over the paper backed adhesive 30 and 40 along the face of the sheet 10 making sure that the adhesive 30 is allowed to contact the sheet 10 only as the roller moves along. This forms a sandwich consisting of the sheet 10, the adhesive 30 and the paper backing 40. After the adhesive is completely applied, any excess is trimmed away with a razor blade. The product is easily applied to an implement by removing the paper backing from a piece of the polyurethane gripping material having the desired size and shape, and attaching it using manual pressure.

The final product is a thin, flexible, spongy, non-abrasive, adhesive-backed, sheet of foamed polyurethane 90 containing many small surface pores created by opening the regions containing salt granules and the regions created by the formation of gas as the polyurethane mixture cures.

The thinness and flexibility of the polyurethane gripping material 90 enables it to be applied to any surface which has fairly smooth contours regardless of whether or not there are minor surface irregularities. The material is easily cut to the desired size and shape using scissors so it may even be applied to implements where a grip is required over an unusual surface configuration. The material's application does not significantly increase the bulk of the implement, however.

The adhesive 30 which backs the polyurethane sheet 10 is waterproof, thereby adapting the polyurethane gripping material 90 for application to surfaces which are wet during normal use, such as the floors of showers. Since the polyurethane gripping material 90 may be applied using manual pressure, it may be used by the consumer, for whatever use, without the need for special equipment or tools.

The spongy characteristics of the sheet 10 arise from the foam consistency produced by the formation of gas bubbles 60 in the polyurethane mixture as it hardens. This characteristic is particularly attractive when the material is to be used on the handle of a racket or bat where the implement is subject to high impact forces. The material then serves to cushion the blow.

The pores 70 and 80 in the surface 20 of the polyurethane gripping material 90 are created by the opening of the gas regions 60 and the salt regions 50. The salt regions 50 are generally several times larger than the gas regions 60. When the surface layer is sanded off, pores of two different sizes are created. The gas pores so created from the opening of the gas filled regions generally contribute to the roughened surface texture of the sheet. This is the first way in which the surface friction of the sheet is augmented. The salt pores 70 created in the regions occupied by the regions of the salt are larger and deeper, however, and there are correspondingly fewer of them. These pores 70, which act as miniature suction cups, also augment the surface friction of the sheet. The presence of water on the surface of the material does not reduce its frictional coefficient as would be the case with an uncovered handle; rather, the water physically reacts with the salt pores 70 so as to enhance the seal between the salt pores 70 and the soft tissues of the user's hand. This suction action is another feature which makes the material well adapted to applications where water is present during normal use. Because there are a large number of the salt pores 70 per unit area of the material, a large number of the pores 70 contact the user's hand or foot at one time. Thus, if one salt pore 70 becomes filled with dirt or foreign objects, it will not appreciably affect the surface friction of the material as a whole since it accounts for only a small fraction of the gripping effect. The nonabrasive character of the sheet 10 also makes it well suited to applications where the user's hands or feet may come in contact with the surface and could be injured by an abrasive surface.

Through continued use it is possible that some of the pores 70 and 80 will become filled with dirt or foreign particles, thereby diminishing the friction of the sheet. The friction of the polyurethane gripping material 90 may be restored, however, by cleaning the surface with a light cleanser or by lightly sanding its surface with a fine grade sandpaper. This exposes additional salt and gas containing regions 70 and 80, which were slightly below the surface of the sheet.

Figure 2:
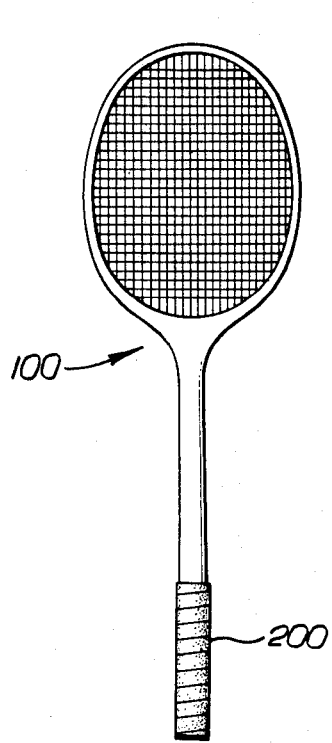
FIG. 2 is a plan view of a hand-held racket which uses the polyurethane gripping material.
Figure 3:
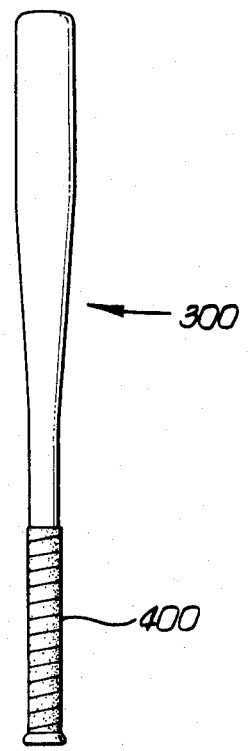
FIG. 3 is a plan view of a baseball bat which uses the polyurethane gripping material.

The application of the polyurethane gripping material 90 to the handles of hand implements in particular may be accomplished as shown in FIGS. 2 and 3. FIG. 2 depicts a racket 100 such as might be used in any type of court game. FIG. 3 shows a baseball bat 300. In both of these applications, the material may be applied either by the original manufacturer or by the consumer by wrapping a long, thin strip of the material helically around the handle of the implements 100 and 300. When applied in this manner the material will attach itself adhesively to the handle and create a permanent grip which is resistant to perspiration and moisture, and also protects the surface of the handle. When the material is finally worn out, however, it may be replaced by merely peeling off the cold covering and applying the new one.

There has been described a thin, flexible, adhesive backed grip enhancing material which may be readily applied to the handles of hand-wielded implements. The grip enhancing material has all the friction enhancing mechanisms of conventional grip enhancing materials but also has embedded in its surface, tiny granules of salt and gas containing regions, which when exposed act as tiny suction cup pores to augment the user's grip. Although such suction pores may become filled with foreign particles, additional pores may be exposed by lightly sanding the surface of the material with a fine grade sandpaper to remove the surface of the material overlying such regions.

It is expressly understood that this invention is not to be limited to the specific embodiments discussed and illustrated herein, but rather only by the scope of the appended claims.

I claim:
1. A method of producing a sheet of flexible resin gripping material having a plurality of pores in the surface thereof comprising the steps of:
   a. forming a sheet of hardenable resin material;
   b. sprinkling said sheet while it is in a softened state with a granular substance of the general size and configuration of ordinary table salt;
   c. allowing said sheet to harden;
   d. removing a portion of the upper surface of said sheet, thereby exposing some of said granules and forming a smooth upper surface;
   e. removing said exposed granules, thereby forming a plurality of pores in the surface of said sheet, wherein said pores are of the general size and configuration of ordinary table salt so as to act as suction devices when in contact with skin.
2. The method of claim 1 where the said granular substance is soluble and the granules are removed by dissolving them in a solvent.
3. The method of claim 1 wherein the resin material is a polyurethane.
4. The method of claim 1 wherein the step of removing the upper layer of said sheet is performed by removing said layer chemically.
5. The method of claim 1 wherein the step of removing the upper layer of said sheet is performed by removing said layer by sanding.
6. The method of claim 2 where said granular substance is table salt and said solvent is water.
7. A handle covered with the material formed by the method of claim 1.

* * * * *